(12) United States Patent  (10) Patent No.: US 8,272,423 B2
Singer  (45) Date of Patent: Sep. 25, 2012

(54) WALL MOUNTED LAMINATOR

(75) Inventor: Karl Singer, Barrington Hills, IL (US)

(73) Assignee: D&K Group, Inc., Elk Grove Village, IL (US)

( * ) Notice: Subject to any disclaimer, the term of this patent is extended or adjusted under 35 U.S.C. 154(b) by 0 days.

(21) Appl. No.: 12/763,411

(22) Filed: Apr. 20, 2010

(65) Prior Publication Data

US 2010/0263800 A1  Oct. 21, 2010

Related U.S. Application Data

(60) Provisional application No. 61/171,144, filed on Apr. 21, 2009.

(51) Int. Cl.
*B32B 37/10* (2006.01)
(52) U.S. Cl. ................... 156/580; 156/583.1
(58) Field of Classification Search ........... 156/580
See application file for complete search history.

(56) References Cited

U.S. PATENT DOCUMENTS

| | | | |
|---|---|---|---|
| 3,401,439 A * | 9/1968 | Staats et al. ............. | 219/244 |
| 4,990,215 A * | 2/1991 | Anderson ................ | 156/540 |
| 5,019,203 A | 5/1991 | Singer | |
| 5,071,504 A | 12/1991 | Singer | |
| 5,520,772 A * | 5/1996 | Levitan et al. .......... | 156/358 |
| 6,467,523 B2 * | 10/2002 | Botta ...................... | 156/498 |
| D544,893 S | 6/2007 | Singer | |

FOREIGN PATENT DOCUMENTS

GB  2236506  4/1991

OTHER PUBLICATIONS

"Nip Rolls" taken from www.niprolls.com, by Schaefer Machine Co., Inc.*

* cited by examiner

*Primary Examiner* — Katarzyna Wyrozebski Lee
*Assistant Examiner* — Daniel Lee
(74) *Attorney, Agent, or Firm* — Ungaretti & Harris LLP

(57) ABSTRACT

A laminated assembly (10) is mountable on a wall and comprises a back support (20) and opposed side supports (40,50) for holding the laminating roller (60) and nip roller (70). The assembly includes hanging supports (120) for hanging the assembly (10) on a wall oriented so that the nip is substantially parallel to the wall and items to be laminated can be fed from above, passed through the machine and released below the machine.

19 Claims, 6 Drawing Sheets

WALL MOUNTED LAMINATOR

CROSS-REFERENCE TO RELATED APPLICATIONS

The present invention claims the benefit of U.S. Provisional Patent Application No. 61/171,144 filed Apr. 21, 2009, the contents of which are incorporated herein by reference.

TECHNICAL FIELD

The present invention generally relates to laminating machines, and more particularly, to a laminating machine that can be mounted on a wall for handling rigid and semi-rigid substrates or materials. The machine is specifically useful when laminating foam board, GATORBOARD®, PVC board, SYNTRA®, matt board, illustration board and cardboard (e.g., 24 pt. board).

BACKGROUND OF THE INVENTION

Lamination with protective films is commonly used to protect print substrates. The laminated product not only looks nice, but also protects from the aging process and environment. Such products typically include a media or substrate such as paper (documents, posters and photographs), polyvinyl chloride (PVC) plastic cards (credit cards, driver's license, or other identification cards), cardboard (packaging or posters), foam-board (presentation, exhibition or display pieces), etc., laminated on one or both sides with a transparent plastic film. The film can be glossy or matte or with a particular texture depending upon the application. Examples of such products include menus, book covers, presentation folders, boxes, video cassette cases, record and CD jackets and displays for stores and exhibition.

As noted, items to be laminated can be laminated using one-sided or two-sided laminations. The laminating and mounting process can be accomplished using heat and pressure (thermal lamination process) or pressure alone (pressure sensitive process). Usually the adhesive employed dictates the process to be used.

For certain applications, it is desired to mount a first substrate onto a supportive rigid second substrate, such as foam board, GATORBOARD®, PVC board, SYNTRA®, matt board, illustration board or cardboard (e.g., 24 pt. board).

In the thermal lamination process, the film, generally polypropylene, polyester, vinyl or nylon, has a layer of heat activated adhesive on one side. The adhesive side is placed against the article or articles to be laminated. The articles to be laminated take two forms: precut and continuous. Usually, the items to be laminated are precut, separated and stacked and then fed automatically or manually into the laminating machine. In the alternative, the articles are continuous or in roll form and fed into the machine. Once laminated, the product is cut at its ends (the leading edge and the trailing edge) and slit along its sides (the side margins).

The film can also be in the form of a discreet sheet, integrated with the substrate to be laminated or separate from the substrate to be laminated, or in continuous, web form. Discreet sheets are commonly used with pouches, e.g., driver's licenses, school pictures, posters, etc. In "pouch-type" laminations, the film is integrated with the substrate to be laminated. Specifically, the film is hingedly adhered to an edge of the substrate, typically foam board. The integral film has a heat activated adhesive on the side of the film facing the substrate.

In continuous form, the film is supplied to the laminator from a supply roll and in web form. Usually, the web of film is fed to the laminating machine from a supply roll and the articles to be laminated are supplied to the machine individually. If the lamination is to be one-sided, the film is supplied from a single roll; if the lamination is to be two-sided, the film is supplied from two, separate rolls, one above the article to be laminated and one below the article to be laminated.

The coatings or adhesives used on these films incorporate vinyl acetate into the backbone of the polyethylene polymer. The resulting resin is an EVA (Polyethylene Vinyl Acetate copolymer) or form thereof. These adhesives are not tacky at room temperature, but become tacky when heat is applied to them, e.g., over 175° F.

As noted previously, for certain applications, such as presentations, advertisements, exhibits, educational training, etc., it is desirable to mount the substrate to be laminated onto a supportive backing, such as a rigid substrate or semi-rigid substrate (e.g., foam board, GATORBOARD®, PVC board, SYNTRA®, matt board, illustration board and cardboard (e.g., 24 pt. board)). To simplify and clarify discussion, the item to be laminated will be called at times the "print substrate," even though it does not necessarily need to be printed. In addition, the surface facing outwardly towards the viewer will be called the "front surface," and the surface facing the backer board will be called the "back surface."

Oftentimes such products can be large, about 24"×36" inches or larger. If a tabletop or free standing laminator is used, there needs to be an in-feed area and an out-feed area to align the items to be laminated before they go into the laminator and to catch the items as they exit the laminator. Without such areas, the items to be laminated and the final laminated product can be dropped and/or damaged. More significantly, if the laminated board is not supported while exiting the machine, the board will bend or curl as the weight of the board with the forces of gravity drive the board downwardly.

In addition, in many print or finishing shops that laminate materials, space is an issue. Space can be very limited. Accordingly, there is a need for laminating equipment that takes up less space and has a small footprint.

The present invention addresses this shortcoming as well as others associated with the laminating process and the laminators existing today.

SUMMARY OF THE INVENTION

One aspect of the present invention is directed to a laminating machine. The laminating machine comprises a frame having an entry end at an upper portion of the frame and a delivery end located below the entry end; a laminating roller substantially horizontally disposed within the frame; a nip roller adjacent the laminating roller; and a nip formed between the laminating roller and the nip roller, the nip having an entry angle oriented less than or equal to about 60 degrees from a vertical axis.

The first aspect of the invention may include one or more of the following features, alone or in any reasonable combination. The machine may further comprise a delivery end opposite the nip, the delivery end having a delivery angle oriented less than or equal to about 60 degrees from a vertical axis. The machine may further comprise a mounting system for supporting the frame above a horizontal baseline. The mounting system may comprise a bracket for mounting the frame against a substantially vertical planar surface. The mounting system may further comprise a stand joined to the frame and comprising at least one leg member spacing the frame from the horizontal baseline. Alternatively, the laminating machine may further comprise a stand joined to the frame and comprising at least one leg member supporting the frame above a horizontal baseline. An axis of rotation of the laminating roller may be no more than 60 degrees above or below an axis of rotation of the nip roller as measured from a horizontal axis intersecting the axis of rotation of the nip roller. The axis of rotation of the laminating roller may be no more than 30 degrees above or below the axis of rotation of the nip roller as measured from a horizontal axis intersecting the axis of rotation of the nip roller. The axis of rotation of the laminating roller may be no more than 15 degrees above or below the axis of rotation of the nip roller as measured from a horizontal axis intersecting the axis of rotation of the nip roller. The axis of rotation of the laminating roller may be no more than 5 degrees above or below the axis of rotation of the nip roller as measured from a horizontal axis intersecting the axis of rotation of the nip roller. The axis of rotation of the laminating roller and the axis of rotation of the nip roller may be substantially horizontally aligned. The nip may be adapted to receive a substrate to be laminated and an overlaminate in the nip in a substantially vertical position wherein the inlet to the nip is above the nip and laminating rollers and outlet of the nip is below the nip and laminating rollers.

Another aspect of the invention is directed to a laminating machine. The laminating machine comprises: a laminating roller and a parallel nip roller positioned so as to form a nip thereinbetween and to receive a substrate to be laminated and an overlaminate in the nip in a substantially vertical position wherein the inlet to the nip is above the rollers and outlet of the nip is below the rollers.

The second aspect of the invention may include one or more of the following features, alone or in any reasonable combination. The rollers may be supported on a back support having hanging supports for attaching the back support to a vertical surface. The machine may further comprise side supports secured to the back support for supporting the rollers and permitting rotation thereof. At least one of the rollers may be moveable relative to the other roller.

Another aspect of the present invention is also directed to a laminating machine. The laminating machine comprises: a substantially horizontal laminating roller and a substantially horizontal and parallel roller oriented so a substrate to be laminated can be fed from above the rollers and released below the assembly; and, means for supporting the rollers against a vertical surface.

Other advantages and aspects of the present invention will become apparent upon reading the following description of the drawings and the detailed description of the invention.

BRIEF DESCRIPTION OF THE DRAWINGS

In the accompanying drawings forming part of the specification, and in which like numerals are employed to designate like parts throughout the same.

DETAILED DESCRIPTION

Figure 1:
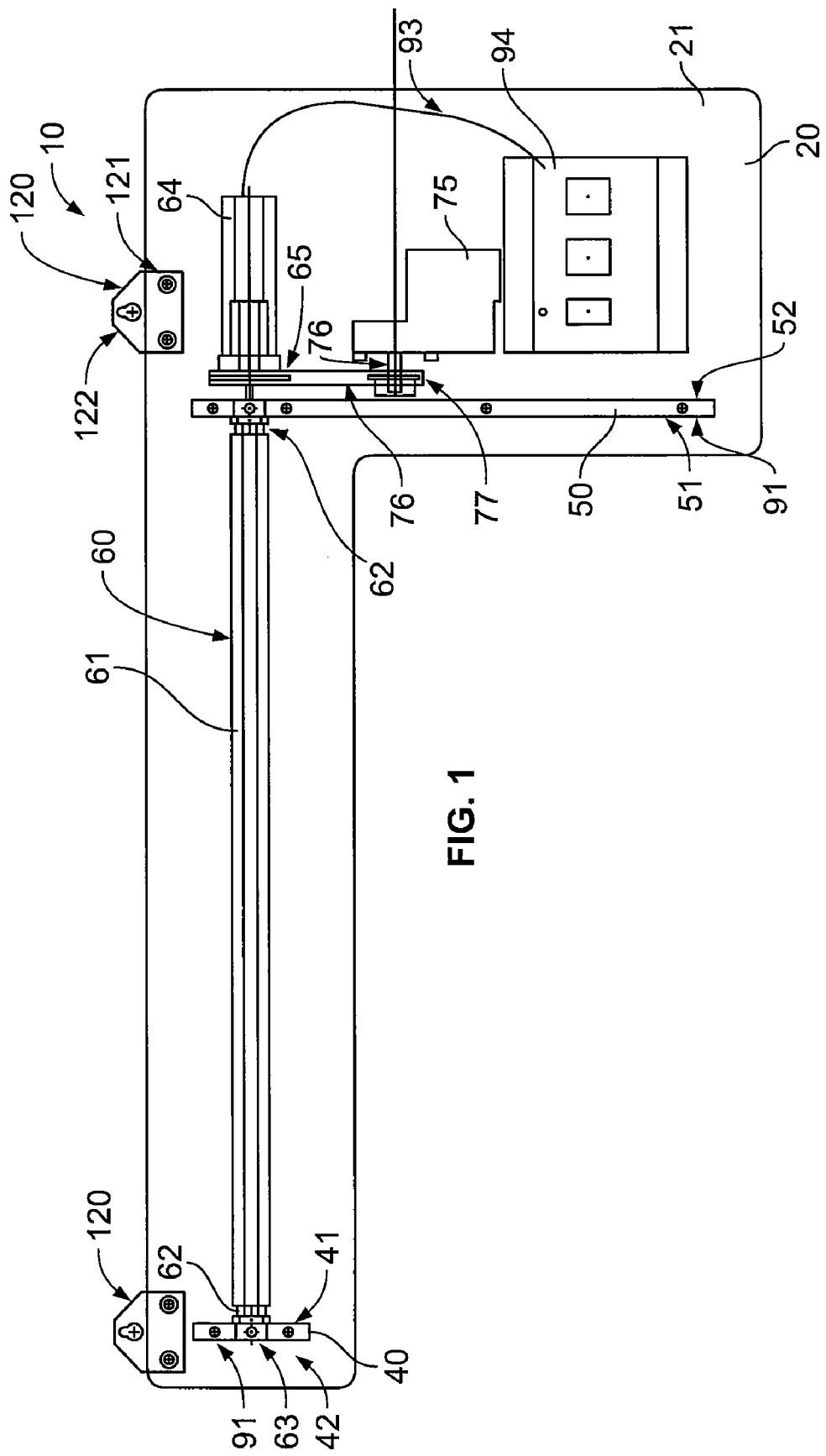
FIG. 1 is a front elevation view of the laminating assembly made in accordance with the teachings of the present invention.

While this invention is susceptible of embodiments in many different forms, there is shown in the drawings and will herein be described in detail preferred embodiments of the invention with the understanding the present disclosure is to be considered as an exemplification of the principles of the invention and is not intended to limit the broad aspect of the invention to the embodiments illustrated.

The laminator 10 of the present invention is shown in the figures with the housing removed. The housing is typically one or more molded pieces used to encase or cover the mechanics and components of the machine, except the controls used by an operator. The housing serves to protect the components, enhance the safety of use and operation and provide aesthetical appeal. Turning to FIG. 1, a laminating machine or laminator 10 made according to the teachings of the present invention is shown. The machine 10 includes a back support or back plate 20, a first side support 40 and a second side support 50. The back support 20 includes a front surface 21, a rear surface 22 and side surfaces 23,24. Similarly, each of the side supports 40,50 have inwardly facing surfaces 41,51 and outwardly facing surface 42,52. The side supports 40,50 are secured in parallel relationship to one another to the front surface 21 of the back support 20. Securement can be by conventional fasteners, such as screws 91.

The side surfaces support a laminating roller 60 and a nip roller 70 thereinbetween. The laminating roller 60 has an outer rubberized surface 61 and heating elements therein. It has shaft ends 62 projecting outwardly therefrom which are supported on bearings 63 held in the side supports 40,50 to permit rotation.

Figure 5:
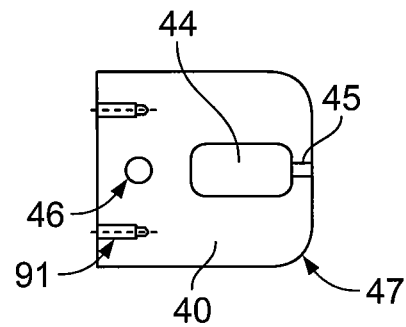
FIG. 5 is the elevation view of the side support of FIG. 4 with the mechanical parts being removed.
Figure 6:
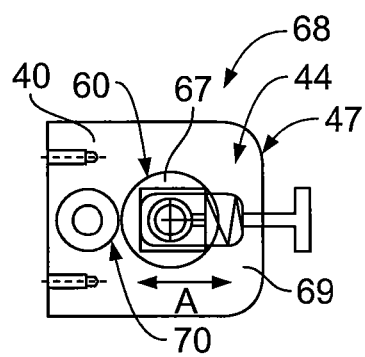
FIG. 6 is the elevation view of the side support of FIG. 4 showing further components associated with each side support.

A nip roller 70 is positioned adjacent the laminating roller 60. It too has an outwardly projecting shaft 72 permitting it to freely rotate against the laminating roller 60 forming a bite thereinbetween. The nip's shafts are supported by bearings (not shown) seated within openings 46 in the side supports 40 (See FIG. 5). The nip roller 70 and laminating roller never touch one another. Both side supports 40,50 further include a slot 44 cut therein and a vertical sink 45 in communications with the slot. As shown more clearly in FIG. 6, the sink 45 projects from an opening in the upper surface/edge 47 of the side support 40 to the slot 44. Each laminating roller bearing 63 is held in a block 67 that sits in a slot 44. The block 67 supporting the bearing can move vertically in the slot 44 towards and away from the nip roller 70. (See Arrow A in FIG. 6). A biasing spring 69 is disposed between the block 67 supporting the bearing 63 and the sink 45 for urging the laminating roller 60 in a direction towards (or away from) the nip roller 70. A thumbscrew 68 is threaded into the sink 45 to push down on the biasing spring 69, which, in turn, pushes downwardly on the block 67. This downward pressure increases the pressure and biasing strength of the spring 69 on the bearing 62 via the block 67. In short, the biasing pressure of the laminating roller in relation to the nip roller (which does not move vertically) can be controlled by a thumbscrew threaded into the sink. By loosening the thumbscrew in the sink 45, the pressure of the laminating roller in a direction normal to the nip roller 70 can be reduced. One will change the biasing pressure of the spring 69 as substrate thicknesses and materials change. For certain substrates, one may want to change the pressure applied by the laminating roller. Similarly, one might want to change the pressure as the thickness of the substrates and laminates changes.

As a result of the above arrangement, the laminating roller can move vertically in the slot and up and down relative to the nip roller. The nip roller assembly is stationary; it does not move relative to the laminating roller. It does, however, rotate as a follower and as a result of rotation of laminating roller or an item being laminated and moving between the nip roller and the laminating roller.

The laminating roller 60 is driven by a motor 75 having a rotating shaft, driving a sprocket (drive gear/sprocket 76) and a chain or belt 77. The chain/belt 78, in turn, drives a sprocket (driven gear/sprocket 65) connected to the shaft 62 of the laminating roller 60. The motor 75 can be mounted on the back plate 20. Preferably, the motor 75 is mounted to the side support 50 by spacers so as to space it from and prevent any interference to the drive gear 76 and chain/belt 77.

An arcuate guard cover 92 is provided over the heated laminating roller 60 to prevent individuals from touching or coming directly into contact with the heated roller 60,61. The guard 92 can also be used as a guide for the laminate or overlaminate. One can place the overlaminate on the guard and feed it from a supply roller (not shown) or by hand generally in the form of discrete sheets. The warmth of the guard, though not dangerous, can also preheat the overlaminate before it passes between the nip formed by the nip roller and laminating roller.

A cylindrical electrical box 64 is secured to one of the shaft ends 62 for housing the circuitry for heating the laminating roller. The electronics therein connect the elements (electrical or liquid) associated with the laminating roller. The box is connected through well-known connections (generally shown as connection 93) to the main electronics box 94. The electronics within the main box 94 include, among other things, an over-temp switch for turning the heating element off in the laminating roller when it is sensed to be too hot, a temperature controller, and a relay.

The main box 94 or the back support 20 support a control panel (not shown) holding or supporting an ON/OFF switch, ON light, OFF light, READY light (signifying the laminating roller has reached the desired temperature and is ready to accept substrates to be laminated), forward and reverse buttons/switches, and an AUTO button. A speed control can be added if desired. The system 10 can be connected to a foot switch (not shown) to start the lamination and with the AUTO button pushed-in, repressing the foot switch becomes unnecessary.

Figure 2:
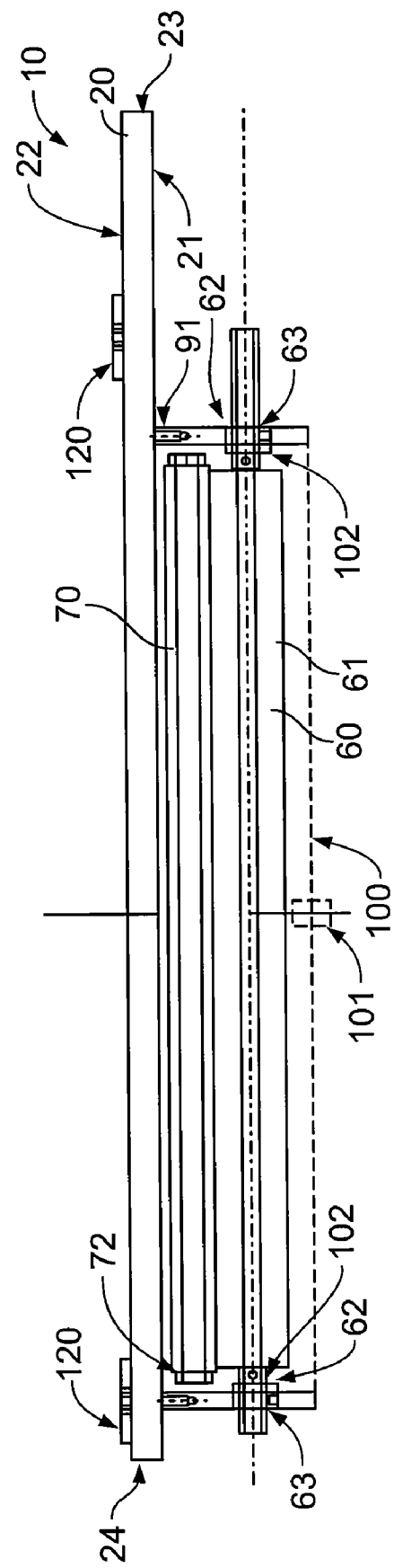
FIG. 2 is a top plan view of the laminating assembly of FIG. 1.
Figure 3:
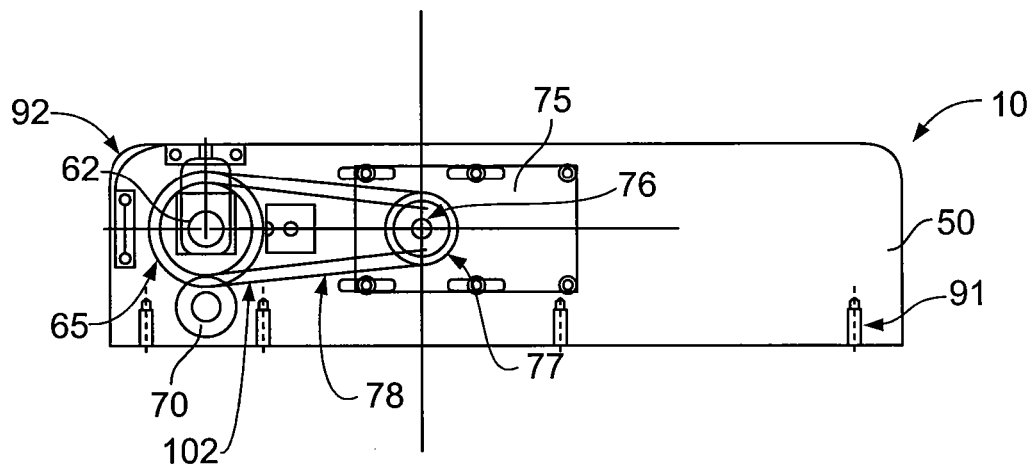
FIG. 3 is a first side elevation view of a side support and the assembly of FIGS. 1 and 2.
Figure 4:
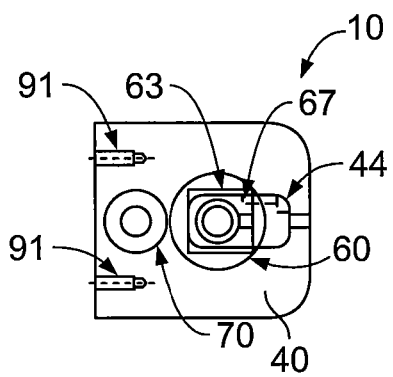
FIG. 4 is a second side elevation view of the other side support and the assembly of FIGS. 1-3.

A support bar 100 is provided running parallel and spaced from and along the laminating roller 60. (See phantom line 100 in FIG. 2). The bar 100 supports a sensor 101, preferably an infrared sensor, for detecting the temperature of the outer surface 61 of the laminating roller 60. This sensor 101 is in communications with the main box 94 and over-temp switch associated therewith.

A photo or physical switch sensor 102 is also provided at the side of the laminating roller 60 approximately at the point of nip between the laminating roller 60 and the nip roller 70 to detect the presence of an item to be laminated. The sensor 102 detects when an item is adjacent thereto (by photo sensing or by movement of the laminator 60 roller) and controls the motor 75 driving the rotating laminating roller 60. When no item is detected, the motor stops, causing the laminating roller to also stop its rotation.

The back plate 20 supports the side plates 40,50, which in turn, support the rollers 60,70, electronics and mechanics. The back plate 20 is specifically constructed to be hung onto a wall. It includes at least two hanging supports 120 secured firmly to the back surface 22 by screws or bolts 121. Each hanging support includes a keyhole 122 for receiving a screw or heavy-duty fastener. For this reason, the hanging supports are spaced so that the keyholes are spaced 32 inches from one another permitting the fastening of the machine 10 and back plate 20 directly into the studs of a wall. As seen in FIG. 1, the machine 10 is attached to the back plate 20 so that the weight is borne directly on the hanging supports 120 and fasteners passing through the keyholes 122. The weight is aligned or distributed so as to minimize the moment of inertia or torque on the fasteners. The side plates 40,50 are spaced approximately 28.5 inches from each other.

Figure 7:
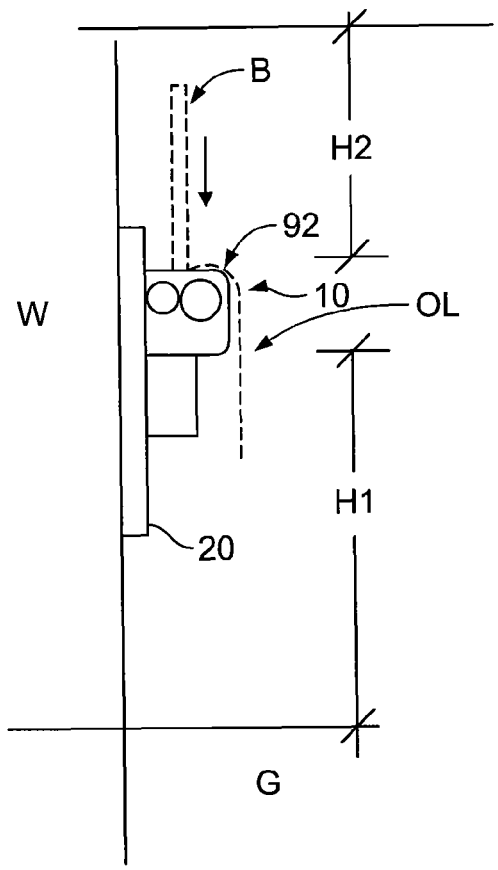
FIG. 7 is a side elevation view of the system mounted to a wall.

FIG. 7 shows a side view of the system 10 mounted to a wall. The back plate 20 is hung on the wall W approximately 3½ to 5 feet (H1) from the ground G. It should have at least the same amount of clearance (3½ to 5 feet (H2)) from the ceiling C. The distances are determined by the size of the boards being laminated by the facility. If the facility laminates boards (B) that are 3 ft. in length, than the system must have at least 3 feet of clearance below (H1) and above (H2) the laminator. Consequently, someone can easily insert a laminate (typically a backing substrate with an image thereon or a separate image substrate thereover, and overlaminate) into the machine 10 from the top, directly into the nip above the laminating and nip rollers 60,70. The laminate will pass through the nip formed between the nip roller and laminate roller (while pressure is being applied by the laminate rollers as a result of the biasing springs) with the aid of gravity and drop to the waiting arms of the operator. There is no need for an in-take and out-take table.

As seen above and shown in FIG. 7, the overlaminate (OL) is also fed from the top of the laminator. The warmth of the guard 92, though not dangerous, preheats the overlaminate draped thereover before it passes between the nip formed by the nip roller and laminating roller. This will often increase the speed and efficiency of the lamination.

Figure 8:
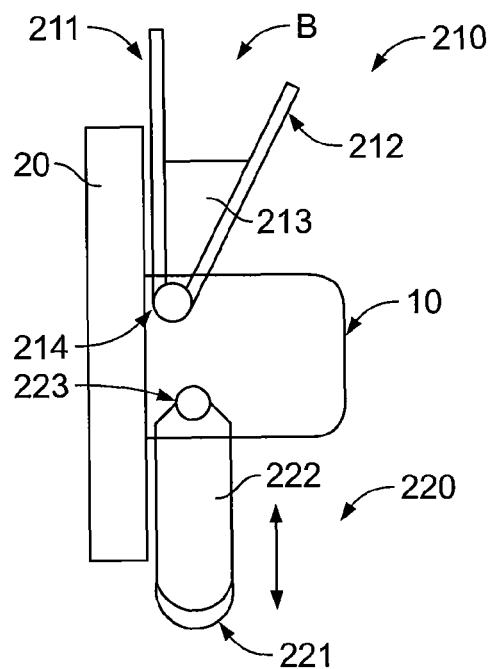
FIG. 8 is a side elevation view of the upper and lower guides.

In addition, guides 210,220 can be placed above the assembly 10 and below the assembly for guiding the substrate to be laminated and the overlaminate to the nip and for catching the laminated product as it exits the assembly. Specifically, as shown in FIG. 8, an upper guide 210 can be attached to the laminator 10 or back board 20. The upper guide has a rear wall 211 and a front wall connected by a web 214. This guide 210 has an opening therein for collecting and guiding the board B into the nip of the machine. Attachment 214 of the guide 210 can be by any conventional means.

A lower guide 220 having a cradle 221 can be also be attached to the laminator 10 or back board 20. The lower guide 220 includes side supports 222 attached to the laminator or backboard. The lower guide is attached by conventional means 223 such that the cradle 221 is biased in a position just below the laminator so as to collect the laminated product exiting the machine and permitting the cradle to support the product as it descends or moves downwardly from the laminator towards the floor. Accordingly, the product exiting the machine is captured by the cradle 221 and carried or supported as it moves downwardly so as to prevent or minimize curling of the heated, exiting, laminated product.

Thus, the laminator 10 generally includes a frame 250 in which the laminating roller 60 and the nip roller are substantially horizontally disposed. The frame 20 has an entry end at an upper portion opposite a delivery end at a lower portion. The nip is formed between the laminating and nip rollers, such that the nip has an entry angle oriented less than or equal to about 60 degrees from a vertical axis, preferably within several degrees of vertical, and most preferably parallel with the vertical axis. This may be accomplished varying the relative heights of the laminating and nip rollers. For example, an axis of rotation of the laminating roller 60 may be no more than 60 degrees above or below an axis of rotation of the nip roller as measured from a horizontal axis intersecting the axis of rotation of the nip roller 70. More preferably, the laminating roller 70 is no more than 30 degrees above or below and axis of rotation of the nip roller as measured from a horizontal axis intersecting the axis of rotation of the nip roller 70. Even more preferably, the laminating roller 60 is no more than 15 degrees above or below and axis of rotation of the nip roller as measured from a horizontal axis intersecting the axis of rotation of the nip roller 70. Still more preferably, the laminating roller 60 is no more than 5 degrees above or below and axis of rotation of the nip roller as measured from a horizontal axis intersecting the axis of rotation of the nip roller 70. Most preferably, however, the axes of rotation of the nip and laminating rollers are substantially horizontally aligned. It follows that the laminator 10 has a delivery angle opposite the nip. The delivery angle is oriented less than or equal to 60 degrees from the vertical axis.

Figure 9:
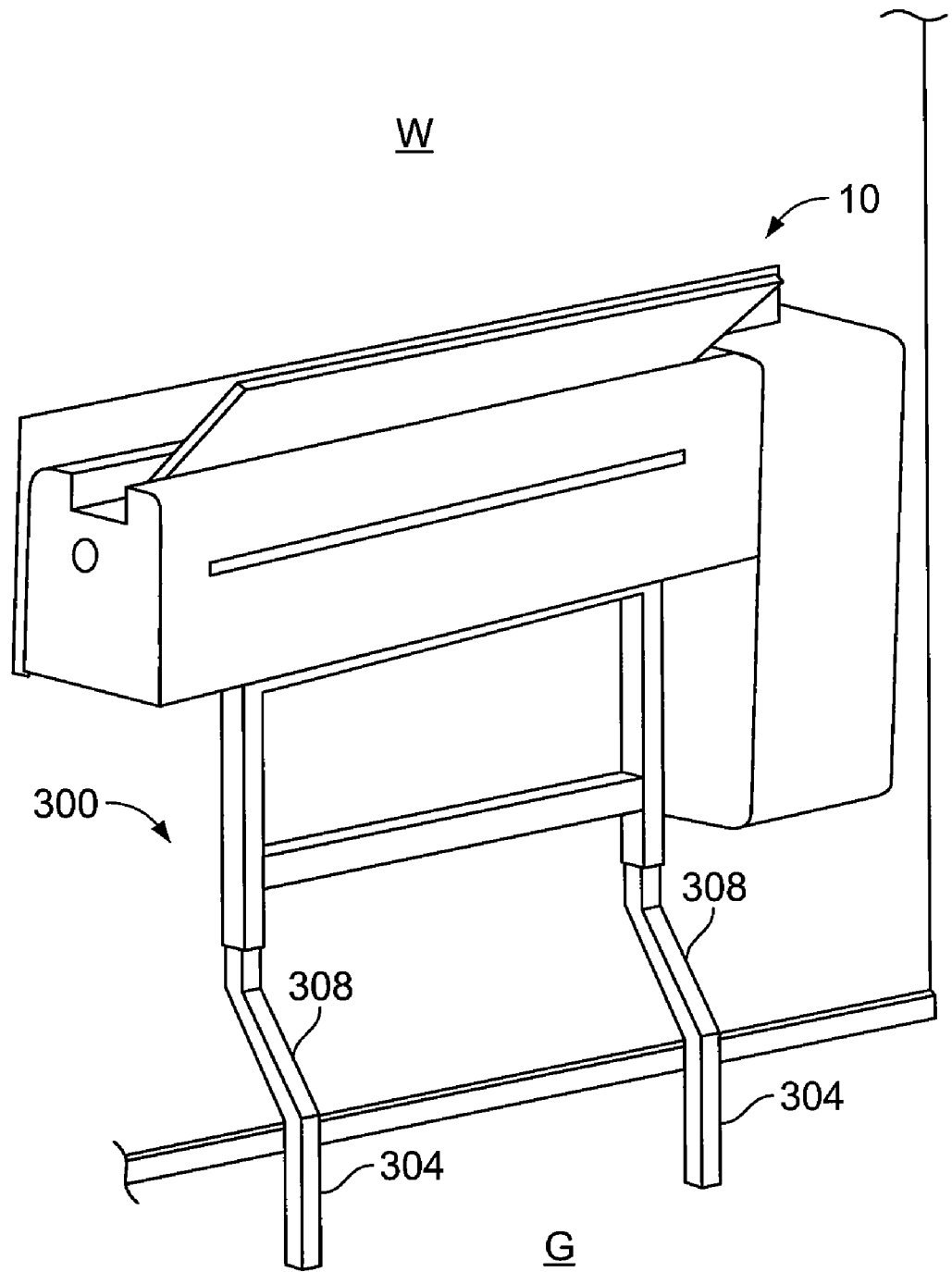
FIG. 9 is a perspective view of the laminating assembly made in accordance with the teachings of the present invention; and, FIG. 10 is a perspective view of the laminating assembly made in accordance with the teachings of the present invention.
Figure 10:
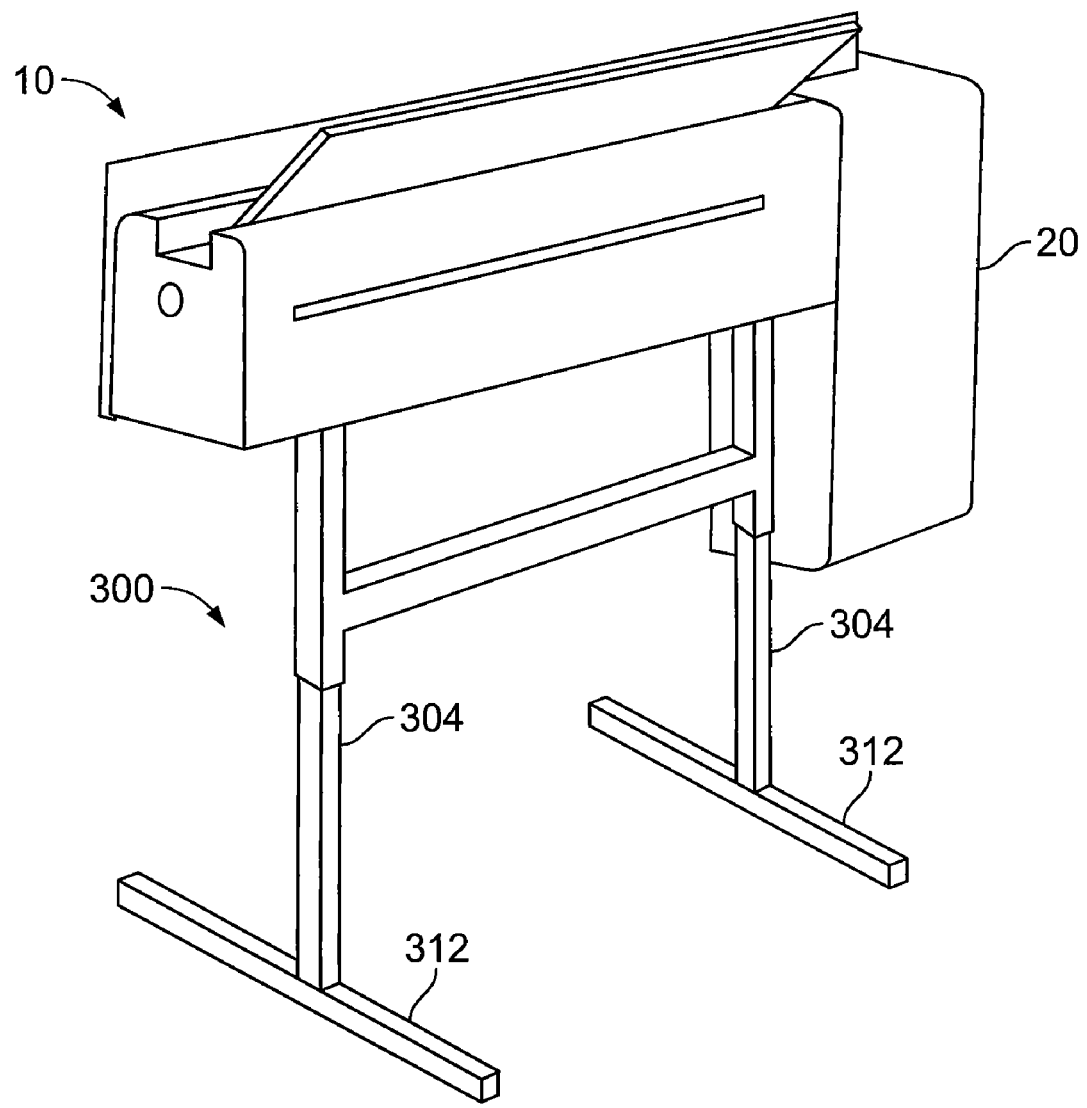

As illustrated in FIGS. 9 and 10, the laminator 10 may be equipped with a stand 300. The stand 300 is provided for either a stand-alone arrangement illustrated in FIG. 9 or in conjunction with the wall mount as described above to add further stability to the laminator 10 as illustrated in FIG. 10. Regardless of the embodiment, the stand 300 has at least one leg 304, spacing the fame above a generally horizontal baseline, preferably a plurality of legs, and most preferably two legs.

The embodiment of FIG. 9 is used in conjunction with a vertical structure such as a generally vertical wall. The frame is attached to the stand which may, in turn, be attached to the wall. Alternatively, the frame may be attached directly to the wall, and the stand 300 may be attached only to the frame or to both the frame and the wall. The stand 300 of this embodiment preferably has two legs 304 extending outwardly and downwardly relative to the frame. Accordingly, each leg 304 includes an offset 308 to displace the let outwardly from the wall. The offset 308 is preferably an angled portion extending outwardly and downwardly located between two substantially vertical segments such that an upper vertical segment lies adjacent to and parallel to the wall and a lower segment is spaced a horizontal distance from the wall. Any number of support members and/or attachment points may be added to the frame 300 for further flexibility and/or strength.

The embodiment of FIG. 10 is used to support the laminator 10 in a generally vertical orientation without the additional support provided by the wall. The stand 300 of this embodiment preferably has two legs 304 extending outwardly and downwardly relative to the frame. Accordingly, each leg 304 terminates in an inverted T-shaped member 312 which engage a generally horizontal baseline surface, such as a floor, to support the frame and the laminator above the baseline. Again, any number of support members and/or attachment points may be added to the frame 300 for further flexibility and/or strength.

The machine 10 is ideal for use with overlaminates and supportive rigid or semi-rigid substrates, such as foam board, GATORBOARD®, PVC board, SYNTRA®, matt board, illustration board or cardboard (e.g., 24 pt. board) having sizes from about 24"×36".

The terms "first," "second," "upper," "lower," "front," "back," "top," "bottom," etc. are used for illustrative purposes only and are not intended to limit the embodiments in any way. The term "plurality" as used herein is intended to indicate any number greater than one, either disjunctively or conjunctively as necessary, up to an infinite number. The terms "joined" and "connected" as used herein are intended to put or bring two elements together so as to form a unit, and any number of elements, devices, fasteners, etc. may be provided between the joined or connected elements unless otherwise specified by the use of the term "directly" and supported by the drawings.

While the specific embodiments have been illustrated and described, numerous modifications can be made without significantly departing from the spirit of the invention and the scope of protection is only limited by the scope of the accompanying Claims.

What is claimed is:

1. A laminating machine comprising:
    a frame having an entry end at an upper portion of the frame and a delivery end located below the entry end;
    a laminating roller substantially horizontally disposed within the frame, the laminating roller comprising heat and variable pressure;
    a motor for driving the laminating roller;
    a nip roller adjacent the laminating roller and acting as a rotational as a follower and as a result of an item being laminated and moving between the nip roller and the laminating roller;
    a nip formed between the laminating roller and the nip roller, the nip having an entry angle oriented less than or equal to about 60 degrees from a vertical axis;
    a guard over the laminating roller to prevent individuals from touching or coming directly into contact with the laminating roller wherein a warmth of the guard provides a preheat to an overlaminate before the overlaminate passes between the nip formed by the nip roller and laminating roller; and
    a sensor located approximately at the nip between the laminating roller and the nip roller to detect the presence of an item to be laminated wherein the sensor detects when an item is adjacent thereto and controls the motor driving the rotation of the laminating roller.

2. The laminating machine of claim 1 wherein the delivery end is opposite the nip, the delivery end having a delivery angle oriented less than or equal to about 60 degrees from a vertical axis.

3. The laminating machine of claim 1 further comprising:
    a mounting system for supporting the frame above a horizontal baseline.

4. The laminating machine of claim 3 wherein the mounting system comprises a bracket for mounting the frame against a substantially vertical planar surface.

5. The laminating machine of claim 4 wherein the delivery end is opposite the nip, the delivery end having a delivery angle oriented less than or equal to about 60 degrees from a vertical axis.

6. The laminating machine of claim 5 wherein the mounting system further comprises a stand joined to the frame and comprising at least one leg member spacing the frame from the horizontal baseline.

7. The laminating machine of claim 6 wherein the delivery end is opposite the nip, the delivery end having a delivery angle oriented less than or equal to about 60 degrees from a vertical axis.

8. The laminating machine of claim 1 further comprising:
a stand joined to the frame and comprising at least one leg member supporting the frame above a horizontal baseline.

9. The laminating machine of claim 1 wherein an axis of rotation of the laminating roller is no more than 60 degrees above or below an axis of rotation of the nip roller as measured from a horizontal axis intersecting the axis of rotation of the nip roller.

10. The laminating machine of claim 1 wherein an axis of rotation of the laminating roller is no more than 30 degrees above or below an axis of rotation of the nip roller as measured from a horizontal axis intersecting the axis of rotation of the nip roller.

11. The laminating machine of claim 1 wherein an axis of rotation of the laminating roller is no more than 15 degrees above or below an axis of rotation of the nip roller as measured from a horizontal axis intersecting the axis of rotation of the nip roller.

12. The laminating machine of claim 1 wherein an axis of rotation of the laminating roller is no more than 5 degrees above or below an axis of rotation of the nip roller as measured from a horizontal axis intersecting the axis of rotation of the nip roller.

13. The laminating machine of claim 1 wherein an axis of rotation of the laminating roller and an axis of rotation of the nip roller are substantially horizontally aligned.

14. The laminating machine of claim 13 further comprising:
a mounting system for supporting the frame above a horizontal baseline comprising a bracket for mounting the frame against a substantially vertical planar surface and a stand joined to the frame comprising at least one leg member spacing the frame from the horizontal baseline.

15. The laminating machine of claim 13 further comprising:
a stand joined to the frame and comprising at least one leg member supporting the frame above a horizontal baseline.

16. A laminating machine comprising:
a motor-driven laminating roller comprising heat and variable pressure and a parallel nip roller positioned so as to form a nip thereinbetween and to receive a substrate to be laminated and an overlaminate in the nip in a substantially vertical position wherein the inlet to the nip is above the rollers and outlet of the nip is below the rollers and wherein the nip roller is rotational as a follower and as a result of rotation of the laminating roller;
a guard over the laminating roller to prevent individuals from touching or coming directly into contact with the laminating roller wherein a warmth of the guard provides a preheat to an overlaminate before the overlaminate passes between the nip formed by the nip roller and laminating roller; and
a sensor located approximately at the nip between the motor-driven laminating roller and the nip roller to detect the presence of an item to be laminated wherein the sensor detects when an item is adjacent thereto and controls rotation of the motor-driven laminating roller.

17. The machine of claim 16 wherein the rollers are supported on a back support having hanging supports for attaching the back support to a vertical surface.

18. The machine of claim 17 further including side supports secured to the back support for supporting the rollers and permitting rotation thereof.

19. The machine of claim 18 wherein at least one of the rollers is moveable relative to the other roller.

* * * * *